United States Patent [19]
Neville

[11] Patent Number: 5,545,311
[45] Date of Patent: Aug. 13, 1996

[54] FILTER CLEANING

[75] Inventor: Mark D. Neville, Stanford-in-the-Vale, United Kingdom

[73] Assignee: United Kingdom Atomic Energy Authority, Didcot, United Kingdom

[21] Appl. No.: 445,868

[22] Filed: May 22, 1995

[30] Foreign Application Priority Data

Jun. 9, 1994 [GB] United Kingdom .................... 9411580

[51] Int. Cl.$^6$ ....................................................... C25F 1/00
[52] U.S. Cl. ............................ 205/712; 205/741; 204/282
[58] Field of Search ............................ 204/141.5, 145 R, 204/282, 130

[56] References Cited

U.S. PATENT DOCUMENTS

| | | | |
|---|---|---|---|
| 4,493,756 | 1/1985 | Degen et al. | 204/141.5 |
| 4,624,760 | 11/1986 | Pottinger et al. | 204/141.5 |
| 5,064,515 | 11/1991 | Harapanahalli . | |
| 5,137,607 | 8/1992 | Anderson et al. | 204/130 |
| 5,162,077 | 11/1992 | Bryan . | |

FOREIGN PATENT DOCUMENTS

| | | |
|---|---|---|
| 0129447 | 12/1984 | European Pat. Off. . |
| 0165744 | 12/1985 | European Pat. Off. . |
| 0380266 | 8/1990 | European Pat. Off. . |
| 0474365 | 3/1992 | European Pat. Off. . |
| 0576157 | 12/1993 | European Pat. Off. . |
| 2160545 | 12/1985 | United Kingdom . |

*Primary Examiner*—John Niebling
*Assistant Examiner*—Kishor Mayekar
*Attorney, Agent, or Firm*—William R. Hinds

[57] ABSTRACT

An electrically conducting filter medium (20) is cleaned in situ by applying, at intervals, a brief voltage pulse between the medium (20) and a counter electrode (18) so the process liquid undergoes electrolysis. The cleaning process is significantly improved by occasionally applying a voltage of reverse polarity. For example a 5 second cleaning pulse making the filter medium (20) cathodic might be applied every quarter of an hour, and a reverse polarity pulse of similar duration applied every two hours. This process can significantly increase permeation rates.

14 Claims, 1 Drawing Sheet

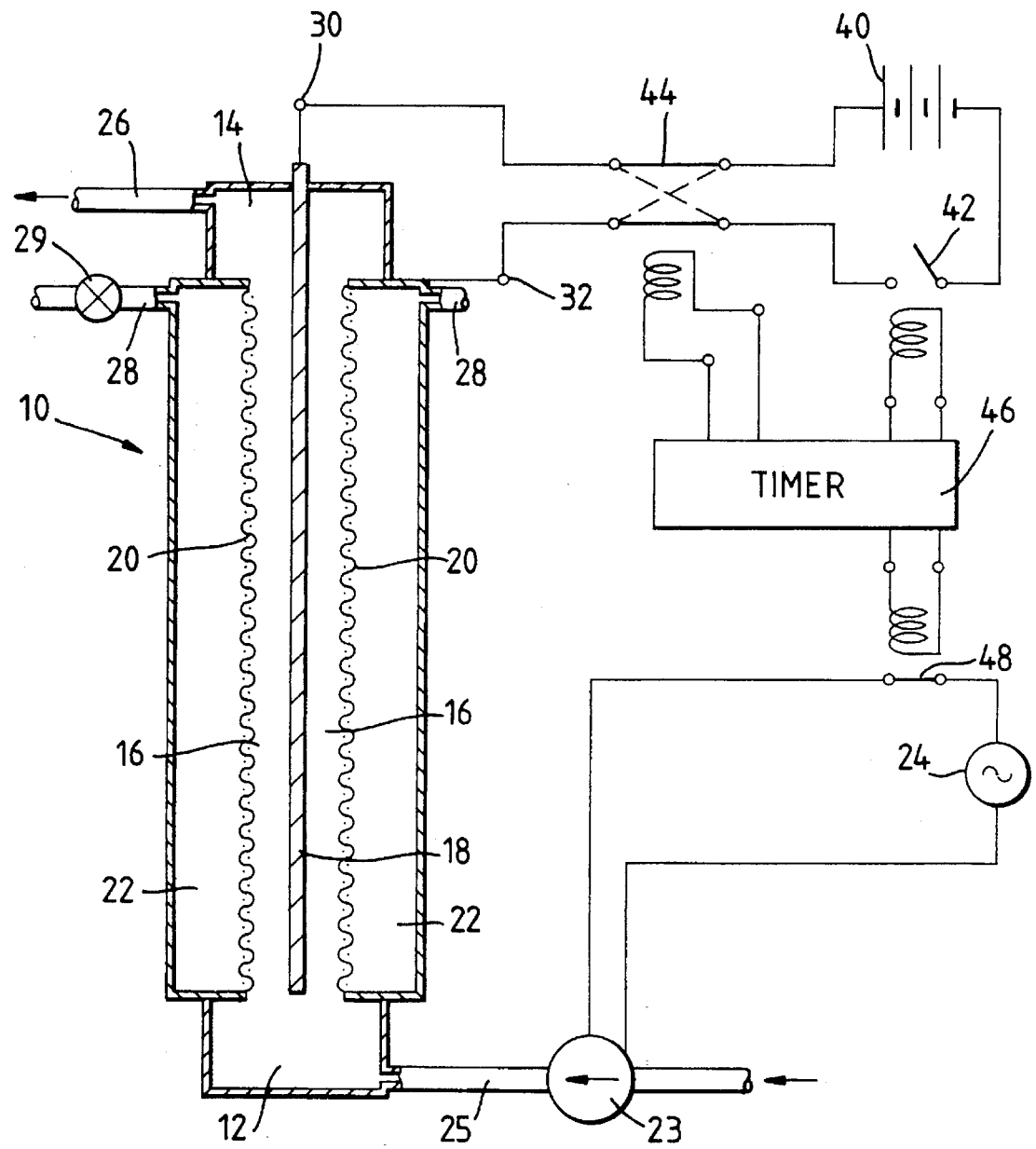

FILTER CLEANING

This invention relates to a method and an apparatus for the electrochemical cleaning of electrically conducting filters.

Filtration is a widely used industrial process and the fouling of filters can be a considerable problem, especially in microfiltration and ultrafiltration. Such fouling tends to reduce filtrate fluxes, and the need for cleaning treatment increases the complexity of filtration equipment, involves plant downtime, and may decrease filter membrane lifetime. Conventionally such cleaning treatment has involved chemical dissolution of foulant material, or backwashing.

An electrochemical cleaning process, applicable where the filter medium is electrically conducting, is described in GB 2 160 545 B. In this process an electrochemical cell is established comprising the filter as a first electrode, a counter electrode, and with the process liquid as the electrolyte. At intervals during the filtration process a potential difference is applied briefly between the first electrode and the counter electrode so as to generate at the filter a gaseous product, which may be in the form of microbubbles, and which disrupts the foulant layer and thereby cleans the filter. This process is described as being applicable for example where the filters are metallic microporous membranes such as those of stainless steel mesh or sintered stainless steel, microporous graphite membranes, or microfiltration and ultrafiltration membranes of conducting ceramics such as doped titania or zirconia. The use of this cleaning process is also described in EP 0 380 266A, in which the filter medium comprises a porous electrically conducting sheet such as woven stainless steel mesh, along with a microporous filter layer of organic or inorganic material which may be electrically non-conducting.

According to the present invention there is provided a method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, and periodically, and briefly, applying a d.c. potential difference between the filter and the counter electrode so as to generate by electrolysis a gaseous product at the filter and so to clean the filter, wherein a potential difference of opposite polarity to the periodically-applied potential difference is applied at least occasionally between the filter and the counter electrode.

The periodically-applied potential difference is typically such that the filter is the cathode, as this minimizes corrosion of the filter. Whilst this potential difference is being applied hydrogen is generated at the filter by electrolysis of water, and the process liquid in the immediate vicinity of the filter is rendered alkaline. The current density is typically between 50 and 300 mA/cm$^2$, for example 200 mA/cm$^2$ (=2000 A m$^{-2}$), and is applied for a few seconds, say between 1 and 10 seconds, for example 5 seconds, periodically say 1 to 12 times an hour, for example every 15 minutes.

In one embodiment of the invention the opposite polarity potential difference is applied at a low voltage so the current density is considerably less, typically less than 20 mA/cm$^2$, for example between 1 and 10 mA/cm$^2$, but is applied for a greater length of time, say between 1 and 24 hours per day (except for when the periodically-applied potential difference is applied). In an alternative embodiment the opposite polarity potential difference is applied at a similar voltage to the periodically-applied potential difference and for a similarly brief period of time, for example at 200 mA/cm$^2$ for 5 seconds, but much less frequently, say between 1 and 12 times a day, for example twice a day.

Typically the opposite polarity potential difference is such that the filter is the anode, so during its application oxygen is generated at the filter by electrolysis of water and the process liquid in the immediate vicinity of the filter is rendered acidic. This considerably improves the cleaning of the filter, and in one trial has been found to increase the permeation rate by over two times. The magnitude of the current, the duration of the pulses, and the frequency of the pulses of both current and reverse current can be optimised for a particular filtration system and application.

As with the previously-described electrochemical filter-cleaning methods, the method of this invention is applicable with for example filters composed entirely of one or more electrically-conducting media (such as sintered stainless steel, microporous graphite, or doped zirconia ceramic membrane), or with filters comprising both a conducting filter medium and a non-conducting filter medium; the filter might for example be a stainless steel mesh with a sintered microporous alumina layer.

The method is applicable for example to tubular filters, and to flat filters as described in GB 2 267 838 A. It is particularly suitable for use with cross-flow filters, as the deposits which are removed by the cleaning process will then be carried away with the flow of the process liquid. It has also been found that still better cleaning of a cross-flow filter can be achieved if during some or all of the applications of the periodically-applied potential difference the cross-flow is stopped. This has the effect that a momentary back pressure is generated across the filter, so a degree of back-flushing takes place.

The present invention also provides a filter apparatus incorporating filter-cleaning means for performing the above described method.

The invention will now be further described by way of example only and with reference to the accompanying drawing which shows a part-diagrammatic, part-sectional view of a cross-flow filtration apparatus.

The apparatus 10 as shown incorporates headers 12, 14 at each end for a liquid undergoing treatment, and two flow channels 16 communicating between the headers 12 and 14, the flow channels 16 being defined between a flat anode plate 18 and flat filter plates 20 of sintered stainless steel microfibres, 0.5 mm thick, on a mesh support, one filter plate 20 facing each side of the anode plate 18. Each filter plate 20 is rectangular, as is the anode plate 18, and the separation between each filter plate 20 and the anode plate 18, that is the width of the flow channels 16, is 3 mm. Each filter plate 20 forms one wall of a rectangular filtrate chamber 22.

A pump 23 connected to a power supply 24 supplies a liquid to be treated to the lower header 12 (as shown) via a pipe 25, while a pipe 26 communicating with the upper header 14 provides an outlet for the treated liquid. Outlet ducts 28 are connected to each filtrate chamber 22, and these incorporate restrictor valves 29 (only one is shown) so there is a steady pressure difference across the filter plates 20 during operation. Electrical terminals 30, 32 enable electrical contact to be made to the anode plate 18 and to the filter plates 20 (only one electrical terminal 32 is shown).

The apparatus 10 also includes electrical circuitry comprising a high voltage dc power supply 40, an electrically-operated on/off switch 42, and an electrically-operated reversing switch 44; the switches 42 and 44 are controlled by a timer 46. The timer 46 is also connected electrically to a switch 48 controlling the power supply 24 for the pump 23, so it can be switched on and off.

Thus in operation the pump 23 is activated to pump the liquid to be treated through the flow channels 16, and so out of the pipe 26, while the filtrate passes through the filter plates 20 into the filtrate chambers 22, and so emerges from the outlet ducts 28. At intervals, typically every quarter of an hour, the timer 46 switches on the switch 42 and switches off the switch 48. The anode plate 18 is made an anode, and both the filter plates 20 are cathodes; the current density is typically 200 mA/cm$^2$, and the hydrogen gas generated by electrolysis dislodges fouling material from the surface of the filter plates 20. In addition the pressure inside the flow channels 16 gradually decreases, because the pump 23 is off, and after 2 or 3 seconds is less than the pressure in the filtrate chambers 22 so some back flushing occurs, which helps dislodge fouling material from the filter plates 20. After a short time, typically set at 5 seconds, the timer 46 switches off the switch 42 and switches on the switch 48, so normal operation commences again.

Once every two hours, just prior to switching on the switch 42, the timer 46 operates the reversing switch 44 for just sufficient time that the next voltage pulse (the eighth pulse at fifteen minute intervals) makes the anode plate 18 a cathode, and the filter plates 20 anodes. Gas evolution (of oxygen) at the surface of the filter plates 20, and back-flushing, have the effect of dislodging fouling material just as with the normal polarity pulse. However the electrolysis makes the liquid in the vicinity of the filter plates 20 become acidic, and this appears to dissolve fine clogging material which is not otherwise removed; in hard water, which contains cations such as calcium or magnesium, this fine material is probably a precipatate of carbonates of these cations. After a pulse of reversed polarity has been applied, the reversing switch 44 reverts to its normal state, so the next pulse makes the anode plate 18 an anode.

The application of such a reverse voltage pulse in this manner has in one experiment been found to increase the filtrate permeation rate from 0.8 m$^3$m$^{-2}$h$^{-1}$ to above 1.6 m$^3$m$^{-2}$h$^{-1}$, in a filter producing potable water from untreated water from a reservoir.

It will be appreciated that the filtration apparatus and its mode of operation may differ from that described while remaining within the scope of the invention. For example a filtration apparatus might comprise several anode plates 18 in a stack, alternating with filtrate chambers with filter plates 20 at each face, defining several flow channels 16 all of width 3 mm, the flow channels 16 communicating with headers at each end. Such an apparatus is described in GB 2 267 838 A. The anode plates 18 might be of low chromium (e.g. 9%) stainless steel, as described in GB 2 247 469 B. The filter plates 20 might be of a different material; in particular they may be made of a material such as low chromium stainless steel, or of a conductive substoichiometric titania, which suffers negligible corrosion whether under anodic or cathodic potentials. The flow channel or chamber and the plates might indeed be a different shape altogether, for example the flow channel might be cylindrical or annular. The mode of operation might also differ, for example the pump 23 might not be switched off at all, or only switched off for some of the voltage pulses. The switches 42, 44 and 48 may be of a variety of different types, for example they may be electro-mechanical switches, or they may be electronic switches such as thyristors. And of course the intensity, duration, and frequency of the voltage pulses, and the frequency of the reversed voltage pulses, might differ from that described. It will also be appreciated that the flow channels 16 may be vertical (as shown) or may have any desired orientation, as operation of such an apparatus is independent of its orientation.

I claim:

1. A method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, periodically and briefly applying a d.c. potential difference between the filter and the counter electrode so as to generate by electrolysis a gaseous product at the filter and so to clean the filter, and applying a potential difference of opposite polarity to the periodically-applied potential difference at least occasionally between the filter and the counter electrode, the applications of the periodically-applied potential difference and those of opposite polarity differing in respect of at least one characteristic selected from the group consisting of magnitude of the potential difference, duration of application, and frequency of application.

2. A method as claimed in claim 1 wherein the periodically-applied potential difference is applied such that the filter is a cathode.

3. A method as claimed in claim 1 wherein the potential difference of opposite polarity is applied at a lower voltage than the periodically-applied potential difference, with a current density at the filter of less than 20 mA/cm$^2$ and is applied for prolonged periods.

4. A method as claimed in claim 1 wherein the periodically-applied potential difference and that of opposite polarity are both of similar magnitudes, and are applied for similar durations, but that of opposite polarity is applied less frequently.

5. A method as claimed in claim 4 wherein both potential differences are such as to create a current density at the filter above 50 mA/cm$^2$.

6. A method as claimed in claim 4 wherein the periodically-applied potential difference is applied at least once an hour, and that of opposite polarity is applied between 1 and 12 times a day.

7. A method as claimed in claim 6 wherein the periodically-applied potential difference is such as to produce a current density between 50 and 300 mA/cm$^2$ at the filter, is provided by a source of potential difference, and is applied for a time of between 1 and 10 seconds periodically between 1 and 12 times an hour, and wherein the potential difference of opposite polarity is applied by temporarily reversing the polarity of said source of potential difference for an interval of no more than 15 minutes during which interval at least one such periodical application of the potential difference is applied.

8. A method as claimed in claim 7 wherein one periodical application in every eight is applied with reversed polarity.

9. A method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, periodically and briefly applying a d.c. potential difference between the filter and the counter electrode so as to generate by electrolysis a gaseous product at the filter and so to clean the filter, and applying a potential difference of opposite polarity to the periodically-applied potential difference at least occasionally between the filter and the counter electrode, the applications of the periodically-applied potential difference and those of opposite polarity differing in respect of at least one characteristic selected from the group consisting of magnitude of the potential difference, duration of application, and frequency of application, wherein during at least some of the applications of the periodically-applied potential difference, there is included the step of applying a reverse pressure difference across the filter, so the process liquid is of lower pressure than the filtrate.

10. A method as claimed in claim 9 wherein the pressure difference reversal is achieved by temporarily ceasing to supply process liquid to the filter.

11. A method of cleaning a porous electrically conducting filter during use of the filter in the filtration of an aqueous process liquid, the method comprising arranging a counter electrode in contact with the process liquid so that the filter, the process liquid and the counter electrode together constitute an electrochemical cell, and periodically applying a potential difference between the filter and the counter electrode so as to generate by electrolysis a gaseous product at the filter and so to clean the filter, and, during at least some of the applications of the periodically-applied potential difference, applying a reverse pressure difference across the filter, so that the process liquid is of lower pressure than the filtrate.

12. A method as claimed in claim 11 wherein the pressure difference reversal is achieved by temporarily ceasing to supply process liquid to the filter.

13. A filter apparatus comprising a porous electrically conducting filter, and means to enable the filter to be cleaned by a method as claimed in claim 1.

14. A filter apparatus comprising a porous electrically conducting filter, means to supply an aqueous process liquid to a region defined at one face of the filter, a counter electrode arranged in the said region such that the filter and the counter electrode constitute electrodes of an electrochemical cell whose electrolyte is provided by the process liquid, and means to apply a d.c. potential difference between the filter and the counter electrode periodically and briefly, wherein the apparatus also comprises means to apply a potential difference of reverse polarity, at least occasionally, between the filter and the counter electrode., the applications of the periodically-applied potential difference and those of opposite polarity differing in respect of at least one characteristic selected from the group consisting of magnitude of the potential difference, duration of application, and frequency of application. the applications of the periodically-applied potential difference and those of opposite polarity differing in respect of at least one characteristic selected from the group consisting of magnitude of the potential difference, duration of application, and frequency of application

* * * * *